UNITED STATES PATENT OFFICE.

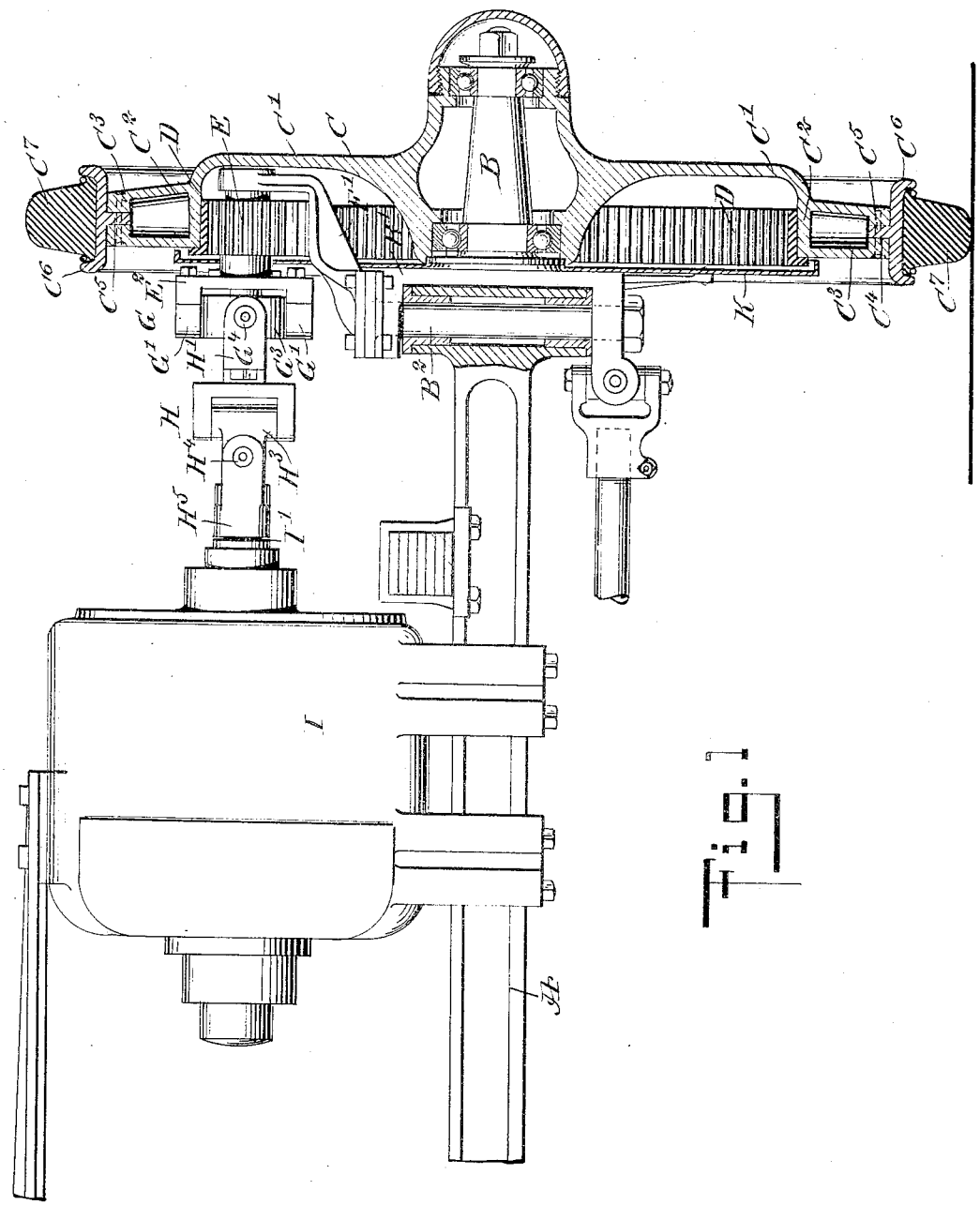

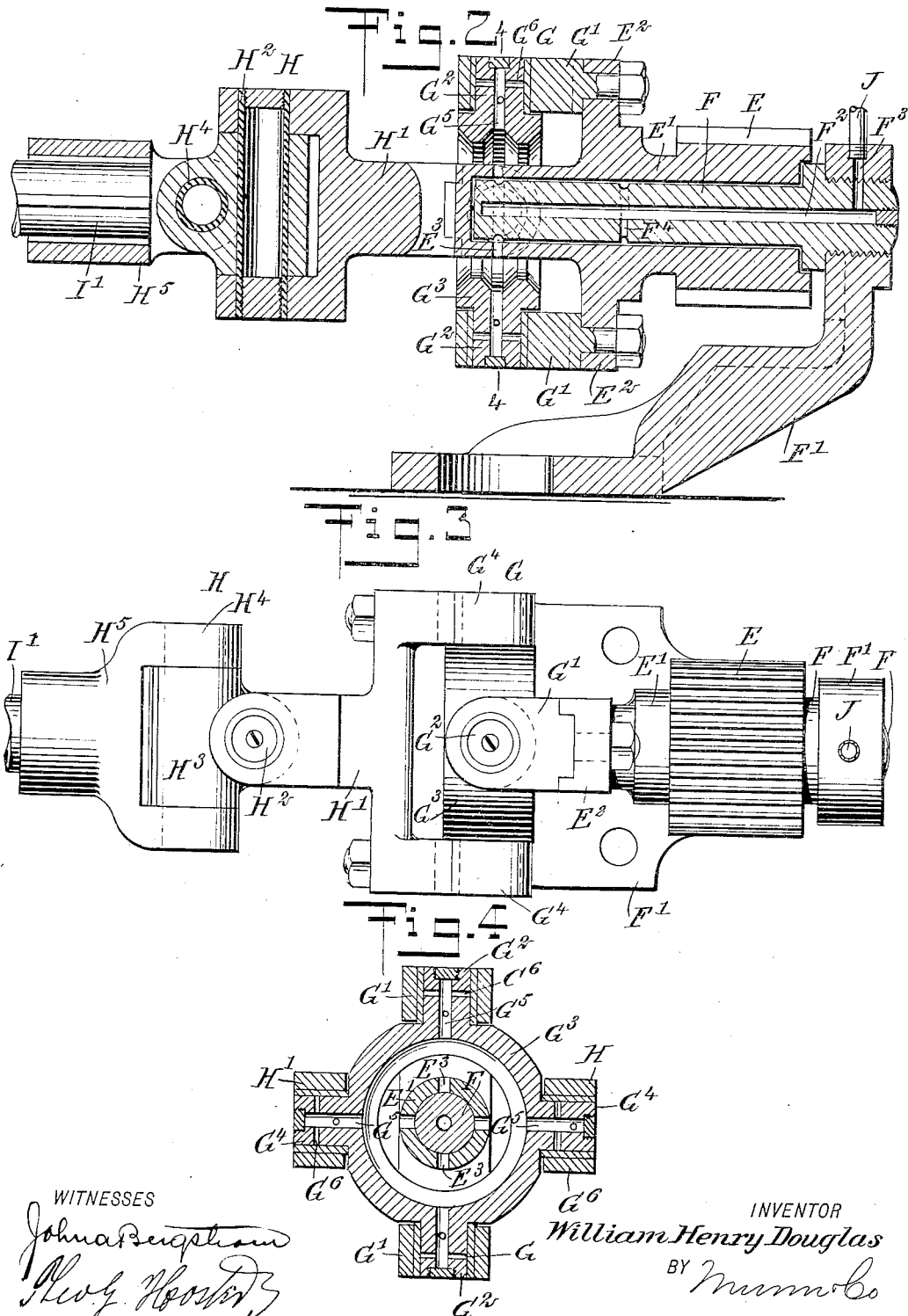

WILLIAM HENRY DOUGLAS, OF BELLEVILLE, NEW JERSEY, ASSIGNOR TO HEALEY & CO., OF NEW YORK, N. Y., A CORPORATION.

DRIVING-GEAR FOR MOTOR-VEHICLES.

No. 864,623.  Specification of Letters Patent.  Patented Aug. 27, 1907.

Application filed September 26, 1906. Serial No. 336,254.

*To all whom it may concern:*

Be it known that I, WILLIAM HENRY DOUGLAS, a citizen of the United States, and a resident of Belleville, in the county of Essex and State of New Jersey, have invented a new and Improved Driving-Gear for Motor-Vehicles, of which the following is a full, clear, and exact description.

The invention relates to driving gears for motor vehicles in which the steering wheels are positively driven, as is shown and described in the Letters Patent of the United States, No. 779,351, granted to me January 3, 1905.

The object of the invention is to provide certain new and useful improvements in driving gears for motor vehicles, whereby power is transmitted without undue loss and a proper lubrication of the parts is had to insure an easy running thereof.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional front elevation of the improvement as applied; Fig. 2 is an enlarged sectional front elevation of the universal joint connection; Fig. 3 is a plan view of the same, and Fig. 4 is a sectional side elevation of the same on the line 4—4 of Fig. 2.

The front axle A of the motor vehicle is provided on each end with the usual pivoted stub axle B on which is journaled a wheel C which is both a traction and a steering wheel, the stub axles B on the ends of the axle A being connected with each other and with a suitable steering device for steering the stub axles B simultaneously to steer the vehicle in the desired direction.

On the web C' of the wheel C is secured an internal gear wheel D in mesh with a pinion E having its hub E' journaled on a stud F carried by a bracket F' bolted or otherwise fastened to the head B' of the stub axle B and which head is connected by a vertical pivot B² with the corresponding end of the axle A. The hub E' of the pinion E is connected by a universal joint G with a second universal joint H connected with the shaft I' of the motor I fastened to the axle A, so that when the motor I is running a rotary motion is transmitted by its shaft I' and the universal joints H and G to the pinion E to rotate the gear wheel D so as to positively drive the wheel C.

The universal joint G is provided with arms G' bolted or otherwise secured to arms E² extending diametrically and integrally from the hub E' of the pinion E, and in the said arms G' are journaled the pivots G² of the ring G³ having diametrical pivots G⁴ journaled in a member H' in the form of a double fork and common to both universal joints G and H. In the member H' of the universal joint H is journaled a pivot H² attached to a body H³ having a pivot H⁴ journaled in the head H⁵ secured to the outer end of the shaft I' of the motor I. As indicated in Fig. 1 the axis of the pivots G² is in the same vertical plane containing the axis of the pivot B², to insure an easy transmission of the power without danger of binding the parts when steering the stub axle B into an angular position in relation to the main axle A at the time the vehicle is steered around a corner.

In order to insure a proper lubrication of the parts from one common source of lubricant supply, the following arrangement is made: The stud F is provided with a central passage F² from which leads a passage F³ to a pipe J connected with an oil cup or other suitable lubricant supply, the pipe J being attached to the bracket F', as plainly indicated in Fig. 2. From the passage F² leads an aperture F⁴ to the inside of the hub E' so as to lubricate the same, it being understood that the inner end of the said hub is closed, as plainly shown in Fig. 2. Near this inner end of the hub E' are formed a number of apertures E³ leading from the interior of the hub and arranged opposite lubricating passages G⁵ formed in the ring G³ at the pivots G² and G⁴ (see Fig. 1), so that any lubricant passing out of the hub E' by way of the apertures E³ passes under centrifugal force into the passages G⁵, from which the lubricant can pass by cross passages G⁶ to the bearing surfaces of the pivots G² and G⁴ to lubricate the same. Thus the lubricant from one common source lubricates both the hub E' of the pinion E as well as the pivots G² and G⁴ of the universal joint G.

The web C' of the wheel C is preferably dished at the inner face so as to form a convenient recess or space for the internal gear wheel D and the pinion E as well as the bracket F' (see Fig. 1), it being understood that the internal gear wheel B is secured to the outer wall C² of the dished portion of the web C'. From this outer wall C² extends outwardly the spoke C³ having a peripheral slot C⁴ into which fits an annular rib C⁵ formed on the underside of the rim C⁶ carrying the usual tire C⁷ of pneumatic or other construction. Pins or bolts extending transversely through the spoke C³ and the rib C⁵ securely hold the rim C⁶ in place.

In order to prevent dust or other impurities from passing to the internal gear wheel B and to the pinion E a cover K is provided attached to the head B' of the stub axle B and covering the inner opening of the dished portion of the web C' of the wheel C. The bracket F' as well as the hub E' of the pinion E extend through the cover K, as indicated in Fig. 1.

The construction shown and described permits a powerful transmission of the power of the motor I to the wheel C, it being understood that undue friction is completely avoided owing to the use of the universal joints G and H shown and above described.

Having thus described my invention, I claim as new and desire to secure by Letters Patent:

1. In a motor vehicle, the combination with an axle having stub axles and wheels journaled on the stub axles, said wheels being provided with internal gears, a motor supported on the axle, and pinions in mesh with the internal gears, means in connection with the stub shafts for supporting the pinions, and double universal joints between the shaft of the motor and the pinions.

2. In a motor vehicle, the combination with an axle having stub axles and wheels journaled on the stub axles, of an internal gear wheel on each wheel, a pinion in mesh with the said gear wheel, a motor supported from the axle, a stud supported on the stub axle and on which the hub of the said pinion is journaled, and a universal joint having one member connected with the shaft of the motor and the other member connected with the hub of the said pinion.

3. In a motor vehicle, the combination with an axle having stub axles and wheels journaled on the stub axles, of an internal gear wheel on each wheel, a pinion in mesh with the said gear wheel, a motor supported from the axle, a stud supported on the stub axle and on which the hub of the said pinion is journaled, a universal joint having one member connected with the shaft of the motor and the other member connected with the hub of the said pinion, and continuous means for lubricating the said hub and the said universal joint from the same source of lubricant.

4. In a motor vehicle, the combination with an axle having stub axles and wheels journaled on the stub axles, of an internal gear wheel on each wheel, a pinion in mesh with the said gear wheel, a motor supported from the axle, a stud supported on the stub axle and on which the hub of the said pinion is journaled, and a universal joint having one member connected with the shaft of the motor and the other member connected with the hub of the said pinion, the said stud having a passage connected with a source of lubricant for supplying lubricant to the said pinion hub, the latter having an outlet for the lubricant directly opposite the pivots of the said universal joint to lubricate the same.

5. In a motor vehicle, the combination with an axle having stub axles and wheels journaled on the stub axles, of an integral gear wheel on each wheel, a pinion in mesh with the said gear wheel, a motor supported from the axle, a stud supported on the stub axle and on which the hub of the said pinion is journaled, and a universal joint having one member connected with the shaft of the motor and the other member connected with the hub of the said pinion, the said stud having a passage connected with a source of lubricant for supplying lubricant to the said pinion hub, the latter having an outlet for the lubricant and the pivots for the said universal joint having lubricating passages, the entrances to which are opposite the said outlet.

6. In a motor vehicle, the combination with an axle having stub axles, of a wheel journaled on each stub axle and having a dished web, an internal gear wheel secured to the said web and extending within the dish space thereof, a driven pinion in mesh with the said gear wheel, and a cover attached to the stub axle for closing the dish opening of the said web.

7. In a motor vehicle, the combination with an axle having stub axles, of a wheel journaled on each stub axle and having a dished web, an internal gear wheel secured to the said web and extending within the dish space thereof, a driven pinion in mesh with the said gear wheel, a bracket carried by the said stub axle and provided with a stud, a driven pinion having its hub journaled on the said stud, and a cover attached to the stub axle for closing the dish opening of the web, the said hub and the said bracket extending through the said cover.

In testimony whereof I have signed my name to this specification in the presence of two subscribing witnesses.

WILLIAM HENRY DOUGLAS.

Witnesses:
THEO. G. HOSTER,
EVERARD B. MARSHALL.